(12) United States Patent
Di Fabbrizio et al.

(10) Patent No.: US 10,726,831 B2
(45) Date of Patent: Jul. 28, 2020

(54) CONTEXT INTERPRETATION IN NATURAL LANGUAGE PROCESSING USING PREVIOUS DIALOG ACTS

(71) Applicant: Amazon Technologies, Inc., Reno, NV (US)

(72) Inventors: Giuseppe Di Fabbrizio, Brookline, MA (US); Shishir Sridhar Bharathi, Bellevue, WA (US); Ying Shi, Seattle, WA (US); Lambert Mathias, Arlington, MA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 14/283,017

(22) Filed: May 20, 2014

(65) Prior Publication Data

US 2015/0340033 A1    Nov. 26, 2015

(51) Int. Cl.
| | |
|---|---|
| *G10L 15/18* | (2013.01) |
| *G10L 15/00* | (2013.01) |
| *G10L 15/22* | (2006.01) |
| *G06F 16/332* | (2019.01) |
| *G10L 15/30* | (2013.01) |
| *G06F 40/35* | (2020.01) |

(52) U.S. Cl.
CPC .......... *G10L 15/18* (2013.01); *G06F 16/3329* (2019.01); *G10L 15/00* (2013.01); *G10L 15/1815* (2013.01); *G10L 15/22* (2013.01); *G06F 40/35* (2020.01); *G10L 15/1822* (2013.01); *G10L 15/30* (2013.01); *G10L 2015/225* (2013.01); *G10L 2015/228* (2013.01)

(58) Field of Classification Search
None
See application file for complete search history.

(56) References Cited

U.S. PATENT DOCUMENTS

| | | | | |
|---|---|---|---|---|
| 5,777,614 | A * | 7/1998 | Ando | .............. G06F 3/0481 |
| | | | | 715/729 |
| 6,246,981 | B1 * | 6/2001 | Papineni | ............ G10L 15/22 |
| | | | | 704/235 |
| 6,356,869 | B1 * | 3/2002 | Chapados | ........... G10L 15/22 |
| | | | | 704/270 |

(Continued)

FOREIGN PATENT DOCUMENTS

| | | |
|---|---|---|
| EP | 1045373 A2 | 10/2000 |
| EP | 2575128 A2 | 4/2013 |

(Continued)

*Primary Examiner* — Fariba Sirjani
(74) *Attorney, Agent, or Firm* — Knobbe, Martens, Olson & Bear, LLP

(57) ABSTRACT

Features are disclosed for processing and interpreting natural language, such as interpretations of user utterances, in multi-turn dialog interactions. Context information regarding interpretations of user utterances and system responses to the user utterances can be maintained. Subsequent user utterances can be interpreted using the context information, rather than being interpreted without context. In some cases, interpretations of subsequent user utterances can be merged with interpretations of prior user utterances using a rule-based framework. Rules may be defined to determine which interpretations may be merged and under what circumstances they may be merged.

19 Claims, 5 Drawing Sheets

(56) References Cited

U.S. PATENT DOCUMENTS

| | | | |
|---|---|---|---|
| 6,633,848 B1 * | 10/2003 | Johnson | H04L 12/2856 370/353 |
| 7,412,393 B1 | 8/2008 | De Fabbrizio et al. | |
| 7,941,312 B2 * | 5/2011 | Jindal | G06F 17/2881 704/255 |
| 8,073,681 B2 * | 12/2011 | Baldwin | G10L 15/22 704/9 |
| 10,417,037 B2 * | 9/2019 | Gruber | G06F 9/4843 |
| 10,475,446 B2 * | 11/2019 | Gruber | G10L 15/18 |
| 2003/0061029 A1 * | 3/2003 | Shaket | G06F 17/279 704/9 |
| 2004/0085162 A1 * | 5/2004 | Agarwal | G10L 15/22 333/196 |
| 2004/0186730 A1 * | 9/2004 | Sun | G10L 15/1822 704/277 |
| 2006/0036430 A1 * | 2/2006 | Hu | G06F 17/271 704/10 |
| 2007/0174057 A1 | 7/2007 | Genly | |
| 2008/0091406 A1 * | 4/2008 | Baldwin | G10L 15/22 704/4 |
| 2012/0016678 A1 * | 1/2012 | Gruber | G10L 13/02 704/275 |
| 2013/0275164 A1 * | 10/2013 | Gruber | G10L 17/22 705/5 |
| 2014/0108453 A1 * | 4/2014 | Venkataraman | G06F 17/30997 707/774 |
| 2014/0257794 A1 * | 9/2014 | Gandrabur | G10L 15/1815 704/9 |
| 2014/0297284 A1 * | 10/2014 | Gruber | G10L 15/18 704/257 |
| 2014/0310001 A1 * | 10/2014 | Kalns | G10L 15/1822 704/270.1 |
| 2015/0095024 A1 | 4/2015 | Tsujino | |
| 2015/0179168 A1 * | 6/2015 | Hakkani-Tur | G10L 15/22 704/257 |
| 2015/0179170 A1 * | 6/2015 | Sarikaya | G10L 15/22 704/275 |

FOREIGN PATENT DOCUMENTS

| | | |
|---|---|---|
| WO | WO 2006/037219 A1 | 4/2006 |
| WO | WO 2013/190956 A1 | 12/2013 |

* cited by examiner

CONTEXT INTERPRETATION IN NATURAL LANGUAGE PROCESSING USING PREVIOUS DIALOG ACTS

BACKGROUND

Speech processing systems include various modules and components for receiving spoken input from a user and determining what the user meant. In some implementations, a speech processing system includes an automatic speech recognition ("ASR") module that receives audio input of a user utterance and generates one or more likely transcriptions of the utterance. ASR modules typically use an acoustic model and a language model. The acoustic model is used to generate hypotheses regarding which words or subword units (e.g., phonemes) correspond to an utterance based on the acoustic features of the utterance. The language model is used to determine which of the hypotheses generated using the acoustic model is the most likely transcription of the utterance based on lexical features of the language in which the utterance is spoken.

Speech processing systems may also include a natural language understanding ("NLU") module that receives textual input, such as a transcription of a user utterance, and determines the meaning of the text in a way that can be acted upon, such as by a computer application. For example, an NLU module may be used to determine the meaning of text generated by an ASR module using a statistical language model. The NLU module can then determine the user's intent from the ASR output and provide the intent to some downstream process that performs some task responsive to the determined intent of the user (e.g., generate a command to initiate the phone call, initiate playback of requested music, provide requested information, etc.).

Some speech processing systems are configured to engage in multi-turn dialog interactions with users. For example, a user may wish to initiate a certain process or task, but may not provide all necessary information. In this case, the speech processing system can prompt the user for the missing necessary information. As another example, user may wish to receive information from the system. The speech processing system can provide the requested information and allow the user to initiate subsequent processes based on the provided information.

BRIEF DESCRIPTION OF DRAWINGS

Embodiments of various inventive features will now be described with reference to the following drawings. Throughout the drawings, reference numbers may be re-used to indicate correspondence between referenced elements. The drawings are provided to illustrate example embodiments described herein and are not intended to limit the scope of the disclosure.

DETAILED DESCRIPTION

Introduction

Figure 1:
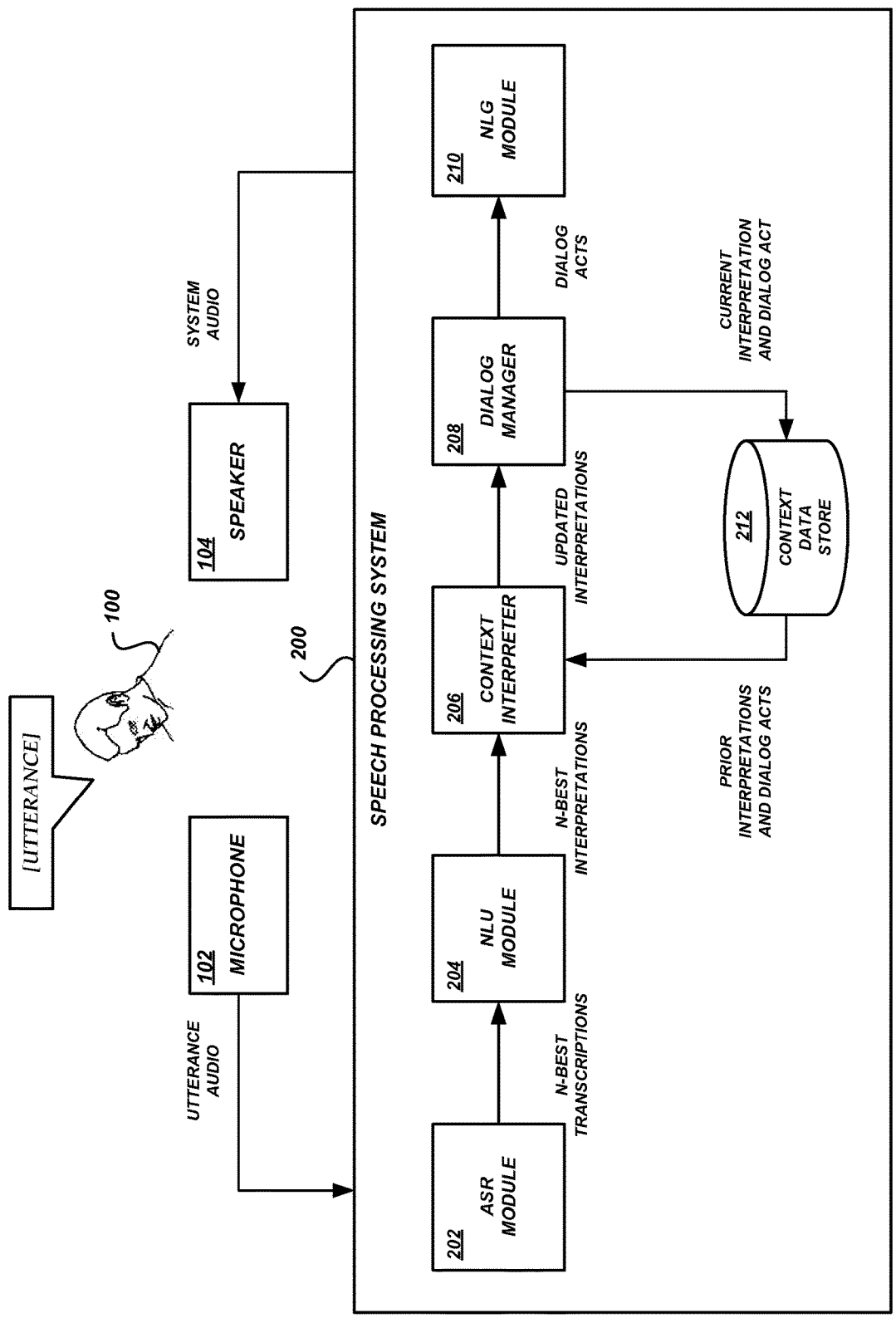
FIG. 1 is a block diagram of illustrative data flows between modules of a speech processing system during multi-turn dialog utterance processing using contextual information from previous turns.

The present disclosure is directed to enhancing the ability of speech processing systems to naturally engage in—and accurately manage—multi-turn dialog interactions with users (e.g., spoken dialog sessions that include multiple user utterances and/or multiple system responses to accomplish some task). Generally described, the accuracy of speech processing results for multi-turn dialog interactions depends, at least in part, on being able to determine the intent or information conveyed by a user's utterance in the context of previous user-initiated and/or system-initiated interactions of the dialog. When a speech processing system fails to maintain the proper context of the multi-turn dialog interaction, or when a user digresses, makes an utterance regarding an unexpected intent, utters a sentence fragment, or the like, the speech processing system may not respond accurately to the user's utterance. Some systems use restrictive grammars or highly structured dialogs that only allow specific responses (e.g., prompts eliciting particular information may only be responded to with the elicited information—all other responses are rejected). However, such systems do not allow the natural spoken interactions desired by many users and application developers. Other systems use internal "hints" or other information regarding the expected subject of a future user utterance (e.g., an expected intent or information relevant to an intent). The next user utterance may be processed with a bias toward the expected subject, while still allowing utterances regarding unexpected subjects to be accepted and processed properly. However, such systems may not properly handle a digression from, and return to, an in-process multi-turn dialog interaction, or they may otherwise lose the current context of the multi-turn dialog interaction too often or too quickly.

Aspects of the present disclosure relate to maintaining a history of turns in a multi-turn dialog interaction (also referred to herein as a "multi-turn interaction" for convenience). In some embodiments, semantic representations of prior user utterances (also referred to herein as "interpretations") and semantic representations of prior system responses and actions (also referred to herein as "dialog acts") can be maintained. By maintaining the semantic representations of prior turns by both the user and the system, the system can refer back to them when interpreting later user utterances in the same multi-turn interaction. For example, the speech processing system can refer back to the interpretation of what a user has said during previous turns of the multi-turn interaction to get additional information or to make decisions about how to respond to a current utterance. The speech processing system can also refer back to what the system itself did in response to those interactions during previous turns of the multi-turn interaction. In this way, the speech processing system can more accurately interpret a current user utterance that relates to some or all prior user utterances and system responses in the multi-turn interaction.

Advantageously, the ability to access multi-turn interaction context can allow the system to correctly interpret sentence fragments (also referred to herein as "non-sentential utterances" or "NSUs"), digressions, ambiguous intents, and the like. For example, a multi-turn interaction may include a request to search for flights from a particular departure location to a particular destination location (e.g., "Search for flights from Los Angeles to Chicago."). One turn of the multi-turn interaction may correspond to an NSU of "in the morning on Friday." The full meaning of this utterance can be inferred using the multi-turn interaction context. It could be interpreted as "Search for flights from Los Angeles to Chicago in the morning on Friday," but it may also be interpreted as a return date or something else. If the multi-turn interaction context includes the system prompt "When would you like to return?," then the proper interpretation of the NSU would be to search for round-trip flights returning in the morning on Friday.

As used herein, the term "semantic representation" refers to a processed representation of the meaning of a user utterance, or an unambiguous representation of the meaning of a dialog act triggered in response to a user utterance. The semantic representation of a user utterance can be an interpretation of the intent of the user utterance rather than merely a transcription or other lexical representation of the user utterance. For example, if a user has spoken the word "tomorrow," other words or phrases (e.g., the day of the week, such as "Thursday," the calendar date, such as the "Apr. 24, 2014", etc.) may be equivalent in a semantic sense. If only the string "tomorrow" is saved, then the context may not be useful when subsequent utterances or dialog acts depend on a specific date, etc. Illustratively, the semantic representation of the user utterance may be an instance of a data structure or programmable object generated by an NLU module or component of the speech processing system to store information about the interpretation of the user utterance, such as the domain of the interpretation, the intent represented by the interpretation, information associated with the intent (e.g., values for "slots" of the intent), etc.

The semantic representation of a system dialog act may be some internal identifier of an action or process to be undertaken by the speech processing system. For example, if the speech processing system elicits additional information from a user (e.g., asking for a travel date in response to a plane ticket search request), the semantic representation of that dialog act may be the code, name, signature, or other identifier (and related information) that is processed by the speech processing system into a user-understandable prompt (e.g., synthesized speech or a visual display). In some embodiments, the semantic representation of the dialog act may be a data structure or programmable object generated by a dialog manager or some other component of the speech processing system to store information about the dialog act, such as the domain of the dialog act, the action represented by the interpretation (e.g., elicitation of information, confirmation of intent, etc.), information associated with a determined intent (e.g., "slots"), etc.

Additional aspects of the present disclosure relate to a rule-based approach to interpreting the context (semantic representations of prior user and system turns) in multi-turn interactions. The rule-based approach can improve natural language understanding accuracy by providing a framework in which to interpret a current user utterance in view of prior interpretations and dialog acts saved as described above. In some embodiments, the rules may define or otherwise facilitate determination of which dialog acts to trigger in response to user utterances, depending upon which previous utterances the user has made and/or which dialog acts have been previously triggered in the current multi-turn interaction. For example, if a user initiates a search for plane tickets, the user may provide certain information relevant to the search (e.g., a travel date, airline, and departure location). The system may prompt the user for a destination, and the user may digress by asking about the weather in various locations. In this scenario, the user may expect previous work done to search for plane tickets (e.g., specifying the travel date, airline, and departure location) to be maintained by the system, and the user may simply provide a destination responsive to the system elicitation of destination information. By storing semantic representations of prior utterances and dialog acts, the speech processing system can gracefully handle this utterance that provides a destination by, e.g., merging it with previously provided information into a fully-formed intent and corresponding slot values.

Further aspects of the present disclosure relate to re-scoring or otherwise re-ranking speech processing results (e.g., NLU results) based on the stored contextual information. In some embodiments, an NLU module or component may generate an n-best list of the top n interpretations (where n is some non-negative integer) of a particular user utterance. Rather than using the rules described above and in greater detail below to process only the top-scoring interpretation or to select only one interpretation that satisfies a rule, the interpretations in the n-best list may be filtered, re-scored or re-ranked based on the application of the rules. For example, if a particular interpretation in the n-best list is merged with a prior interpretation, the combined merged interpretation may be inserted into the n-best list and may be given a score that is higher or otherwise indicates more relevance than the un-merged intent alone. Re-ranking can help to reduce or prevent the chance that the speech processing system will use any interpretation that satisfies a rule, even if the interpretation is associated with a low recognition confidence. Instead, the true "correct" result may be maintained in an n-best list of results, and may therefore be recognized correctly.

Although aspects of the embodiments described in the disclosure will focus, for the purpose of illustration, on a distributed system in which user utterances are received by a client device and audio data is transmitted to a separate network-based speech processing system for processing, one skilled in the art will appreciate that the techniques disclosed herein may be applied to any number of software processes or applications performing speech processing. For example, a user device may include some or all of the modules, components, or other functionality to process speech and maintain context. In addition, although aspects of the embodiments described herein will focus, for the purpose of illustration, on speech recognition performed on user utterances, the inventions are not so limited. In some embodiments, the context interpretation systems and techniques may be applied to natural langue input of any kind. For example, user-supplied text or other non-verbal input may be processed. In such cases, the speech processing system may be replaced by, or supplemented with, a more general natural language processing system. Various aspects of the disclosure will now be described with regard to certain examples and embodiments, which are intended to illustrate but not limit the disclosure.

Example Speech Processing System with a Context Interpreter

With reference to an illustrative embodiment, FIG. 1 shows a speech processing system that may implement aspects of the present disclosure. In particular, FIG. 1 shows example data flows between various speech and language processing modules in response to receipt of user utterances. A user 100 may make an utterance, such as an utterance that includes a spoken command for a computing system to perform some task. In one specific non-limiting example, the user 100 may say "Search for flights departing from Los Angeles next Friday." The user 100 may speak the utterance into (or in the presence of) some client device operated by the user.

The client device (e.g., client device 300 shown in FIGS. 2 and 3) can correspond to a wide variety of electronic devices. In some embodiments, the client device may be a computing device that includes one or more processors and a memory which may contain software applications executed by the processors. The client device may include or be in communication with an audio input component for accepting speech input on which to perform speech recognition, such as a microphone 102. The client device may also include or be in communication with an output component for presenting responses or other information from the speech processing system 200, such as a speaker 104. The software of the client device may include hardware components and/or software for establishing communications over wireless communication networks or directly with other computing devices. Illustratively, the client device may be a mobile device, such as a mobile phone, personal digital assistant ("PDA"), mobile gaming device, media player, electronic book reader, tablet computer, laptop computer, or the like. In some embodiments, the client device may be a substantially stationary device, such as a television with program execution capabilities and network connectivity (a "smart TV"), set-top box, gaming console, home entertainment system, desktop computer, server computer, or the like.

As shown in FIG. 1, user utterances may be provided to a speech processing system 200. The speech processing system 200 can be a network-accessible system in communication with the client device via a communication network, such as a cellular telephone network or the Internet. A user may use the client device to submit utterances, receive information, and initiate various processes, either on the client device or at the speech processing system 200. For example, the user can issue spoken commands to the client device in order to search for plane tickets as described above, set timers, listen to music, initiate phone calls, etc.

The speech processing system 200 may include an ASR module 202 that performs automatic speech recognition on audio data regarding user utterances, an NLU module 204 that performs natural language understanding on transcriptions generated by the ASR module 202, a context interpreter 206 which applies contextual rules to current NLU results based on prior interpretations and dialog acts, a dialog manager 208 that manages user interaction with the speech processing system 200 and initiates various dialog acts, a natural language generation ("NLG") module that converts certain dialog acts into user-understandable communications (e.g., text that can be "read" to the user by a text-to-speech or "TTS" component), and a context data store 212 for storing semantic representations of previous user utterances and system dialog acts.

The speech processing system 200 may include any number of server computing devices, desktop computing devices, mainframe computers, and the like. Each individual device may implement one of the modules or components of the speech processing system 200. In some embodiments, the speech processing system 200 can include several devices physically or logically grouped together to implement one of the modules or components of the speech processing system 200. For example, the speech processing system 200 can include various modules and components combined on a single device, multiple instances of a single module or component, etc. In one specific, non-limiting embodiment, the speech processing system 200 may include a server or group of servers configured with ASR and/or NLU modules 202, 204, a server or group of servers configured with a context interpreter 206 and/or a dialog manager 208, etc. In multi-device implementations, the various devices of the speech processing system 200 may communicate via an internal communication network, such as a corporate or university network configured as a local area network ("LAN") or a wide area network ("WAN"). In some cases, the devices of the speech processing system 200 may communicate over an external network, such as the Internet, or a combination of internal and external networks.

In some embodiments, the features and services provided by the speech processing system 200 may be implemented as web services consumable via a communication network. In further embodiments, the speech processing system 200 is provided by one more virtual machines implemented in a hosted computing environment. The hosted computing environment may include one or more rapidly provisioned and released computing resources, which computing resources may include computing, networking and/or storage devices. A hosted computing environment may also be referred to as a cloud computing environment.

In some embodiments, the features of the speech processing system 200 may be integrated into the client device such that network connection and one or more separate computing systems are not necessary to perform the processes of the present disclosure. For example, a single client device may include the microphone 102, the ASR module 202, the NLU module 204, the dialog manager 206, the skip list 208, or some combination thereof.

Returning to the examples described above and in greater detail below, users may submit utterances that may include various commands, requests, and the like. The microphone 102 may capture utterance audio and provide it (or data derived therefrom) to the speech processing system 200. The ASR module 202 may generate ASR results for the utterance, such as an n-best list of transcriptions. Each transcription or portion thereof may be associated with some score, such as a confidence score or a likelihood that the transcription or portion thereof is correct. The n-best list or some other type of results may be provided to the NLU module 204 so that the user's intent may be determined. An n-best list of interpretations (e.g., intents) may be determined or generated by the NLU module 204 and provided to the context interpreter 206. The context interpreter 206 can process the NLU results (e.g., modify individual interpretations, filter interpretations, re-score or re-rank interpretations, etc.) as described in greater detail below, and provide processed results to the dialog manager 206. Illustratively, the context interpreter 206 may merge a current NLU result with a prior result that was stored in the context data store 212 based on the application of a context interpretation rule. The dialog manager 208 may then generate a response (e.g., a confirmation) based on the merged result, and the NLG module 210 can translate the semantic response generated by the dialog manager 208 into human-readable text, synthesized speech, etc. The semantic response generated by the dialog manager 208 can be stored in the context data store 212, along with semantic representations of prior responses, user utterances, and the like.

Example Multi-Turn Interactions Processed Using a Context Interpreter

Figure 2:
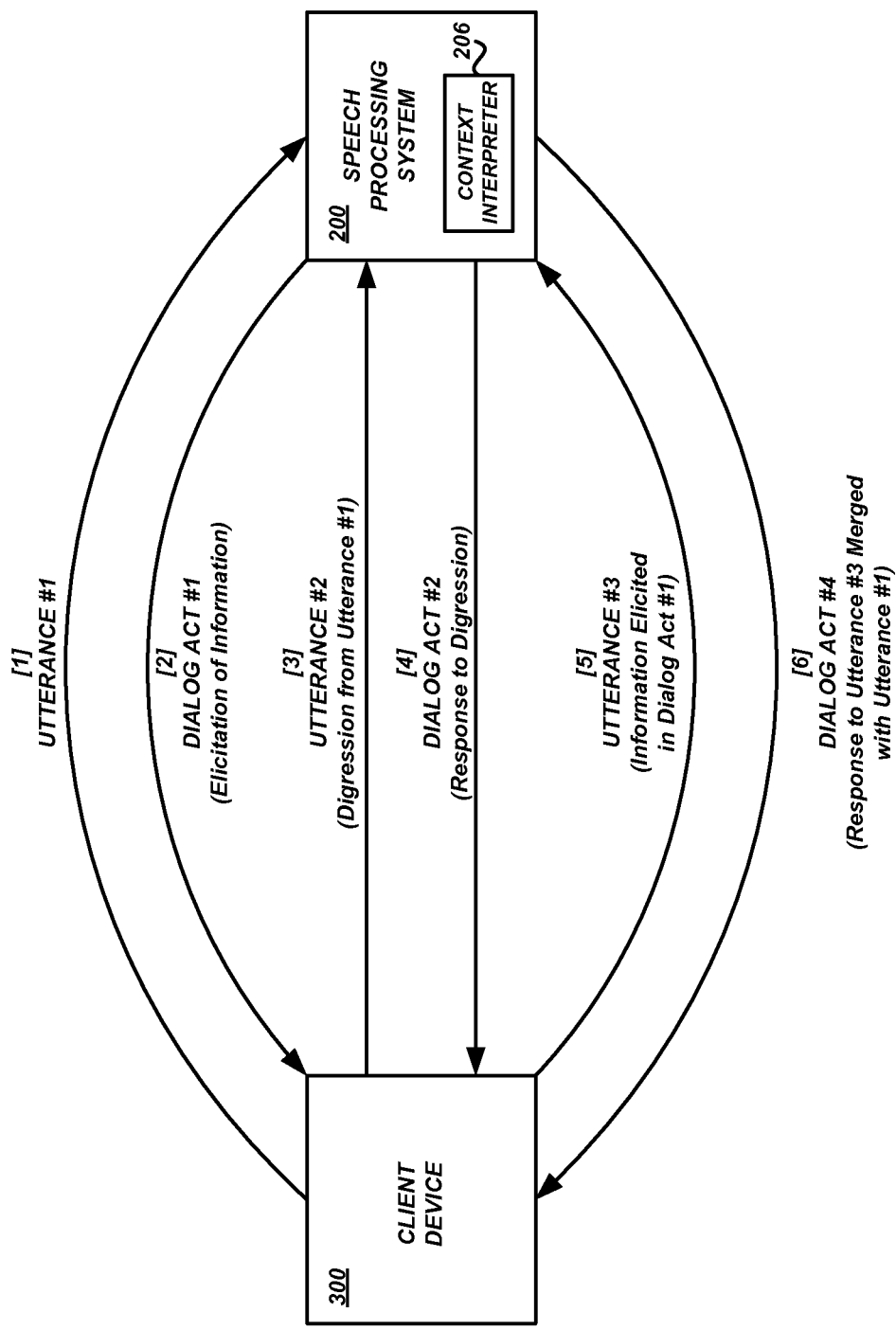
FIG. 2 is a block diagram of illustrative data flows between a client device and a speech processing system during utterance processing using a context interpreter.
Figure 3:
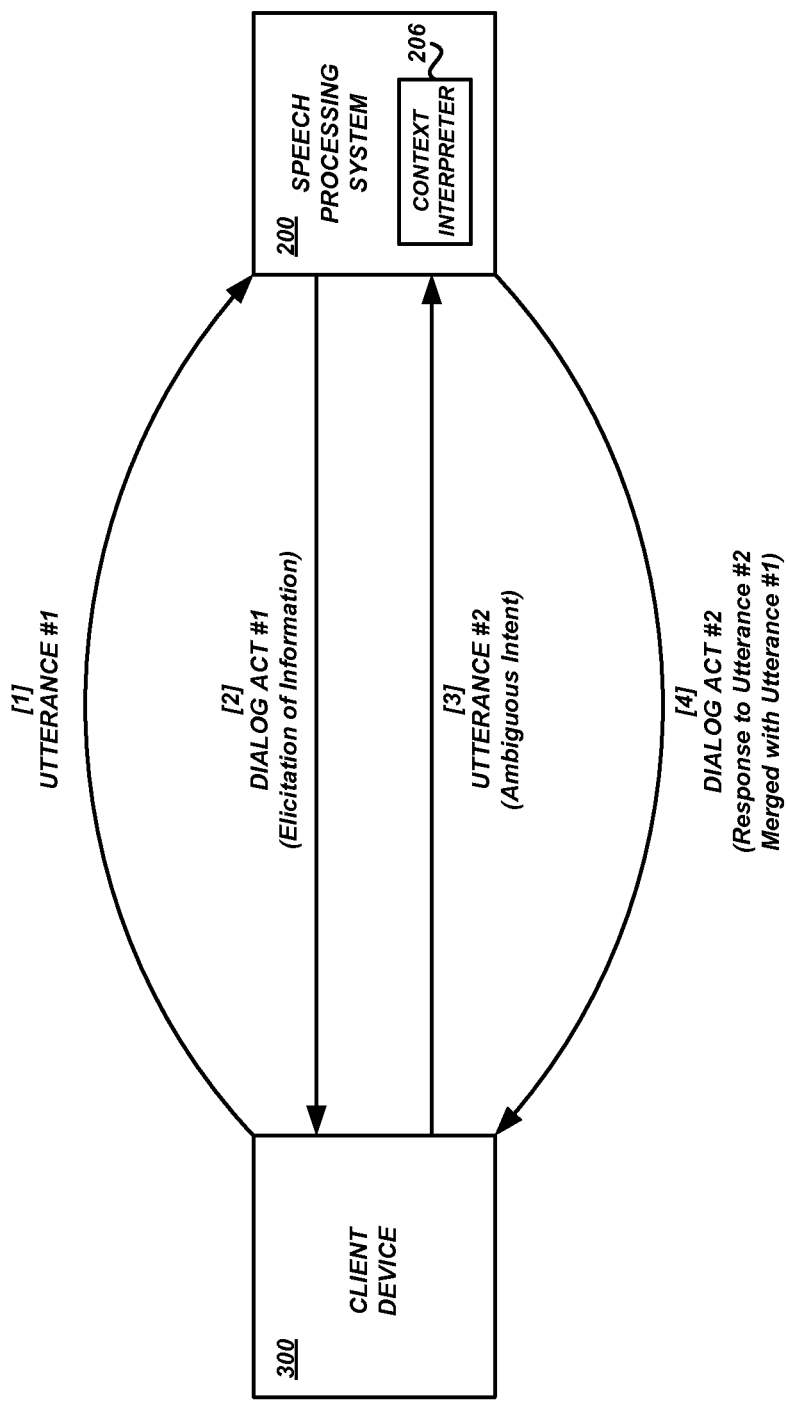
FIG. 3 is a block diagram of illustrative data flows between a client device and a speech processing system during utterance processing using a context interpreter.

FIGS. 2 and 3 illustrate example interactions between a client device 300 and a speech processing system 200 during multi-turn interactions. During a multi-turn interaction, the speech processing system 200 and a user of the client device 300 can each take turns and exchange one or more utterances to achieve some goal, such as finding a song, buying music, booking a flight, etc. As described above, each user utterance can be represented by an interpretation (a semantic representation of the meaning of a user utterance, or some portion thereof), and each system communication can be represented by a dialog act (a semantic representation of the meaning of a system prompt, or some portion thereof).

The examples illustrated in FIGS. 2 and 3 (and other examples herein) are described with reference to particular dialog acts for illustration purposes only. The dialog acts described herein are not exhaustive of every dialog act that may be implemented by a speech processing system. In some embodiments, dialog acts may be categorized into four main types: (1) explicit confirmation of a slot value or intent; (2) implicit confirmation of a slot value or intent; (3) elicitation of a slot value; and (4) disambiguation of a slot value or intent.

For example, the system may explicitly confirm the value of a particular slot or the correctness of a particular intent when it has low confidence in its interpretation, when acting on the intent will cost money or be difficult to reverse, etc. The system can formulate a yes/no question (e.g., "You'd like to purchase the song 'Fly Me to the Moon,' right?"). The user can confirm or reject the slot value (e.g., the value of "Fly Me to the Moon" for the "Song-Title" slot of a "Purchase-Song" intent) or the intent itself.

As another example, the system may implicitly confirm the value of a slot or the correctness of an intent by presenting a prompt in the form of a statement (e.g., "Now playing 'Fly Me to the Moon' by Frank Sinatra"). The user may decide to correct a wrongly interpreted input by replying with a sentence fragment (e.g., "No, 'My Way'"), which is typically interpreted by the speech processing system as a non-sentential utterance ("NSU") with a specific slot value but without a corresponding intent.

As a further example, the system may be missing a slot value that is required in order to take action on a particular intent. The system may elicit a value for the missing slot with an explicit question (e.g., "Which song?"). In this case, the user is expected to utter a sentence fragment, which is typically classified as an NSU with a specific slot value.

As a still further example, the system may be unable to confidently determine into which of two or more slots a particular value is to be placed, or to which of two or more intents a user is referring. The system can elicit user disambiguation with an explicit question (e.g., "Did you mean the album or the song?"). In this case, the user is expected to utter a sentence fragment, which is typically classified as an NSU with a specific slot name or intent name.

With reference to FIG. 2, an example of a user digression or unexpected intent will be described. Advantageously, interpreting current utterances within the context of prior turns in a multi-turn interaction can help a speech processing system understand that a current utterance relates to a previous dialog act, such as an elicitation of information by the system, even when one or more intervening turns of the multi-turn interaction do not relate to the previous dialog act. In a system that does not maintain and use multi-turn context in this way, such intervening user digressions or unexpected intents may cause the system to misinterpret or fail to interpret an otherwise relevant and responsive utterance by a user (e.g., the system may "forget" that the previous dialog act was generated).

As shown in FIG. 2, a user may make a first utterance of a multi-turn interaction, which is transmitted by the client device 300 to the speech processing system 200 at [1]. Illustratively, the utterance may be "Search for flights departing from Los Angeles next Friday." The speech processing system 200 can process the utterance using the ASR module 202 and NLU module 204 as described above. The dialog manager 208 can store a semantic representation of the utterance (e.g., "Search-Flights-Intent(Departure-Date=4/23/2014; Departure-Location=LAX)") in the context data store 212, and generate a dialog act responsive to the utterance (e.g., "Elicit-Information(Destination-Location)"). The NLG module 210 may generate a user prompt based on the dialog act (e.g., "What is your destination?"), and the prompt may be provided to client device 300 at [2] for presentation to the user.

Rather than responding to the elicitation, the user may digress or make some unexpected or non-responsive utterance. For example, the user may say "What is the weather like in Chicago?" The client device 300 can provide the digression to the speech processing system 200 at [3]. The speech processing system 200 may generate preliminary speech processing results (e.g., an n-best list of interpretations of the utterance, as described above), and the preliminary results may be provided to the content interpreter 206. The context interpreter 206 may process the results as described in greater detail below with respect to FIGS. 4 and 5. For example, one of the n-best interpretations of the utterance may be that the utterance is a fully formed intent for requesting weather in a location. Because no prior dialog act or interpretation in the context data store 212 relates to that intent, the context interpreter 206 may not modify the interpretation. As another example, a second interpretation of the n-best list may be that the utterance is an NSU providing a value for a "Destination-Location" slot. Because the context data store 212 includes a prior dialog act eliciting that particular slot value, the interpretation may be merged with the prior interpretation (also in the context data store 212) of "Search-Flights-Intent( . . . )" in order to provide a missing slot value. This merged interpretation may be inserted into the n-best list. However, the first interpretation in the n-best list (e.g., the fully formed weather location intent) may be associated with a score indicating that the system 200 has a higher confidence in the correctness of that interpretation than the merged interpretation. The first interpretation can be acted upon by the dialog manager 208 (e.g., to generate a dialog act to provide the weather at the requested location) and by the NLG module 210 to provide a response to the client device 300 at [4]. In addition, the chosen interpretation and generated dialog act can be stored in the context data store 212.

The user may subsequently make an utterance that is related to the initial turns of this illustrative multi-turn interaction. For example, the user may decide to continue searching for flights by providing the information previously elicited by the system 200 at [2]. The user may say "Chicago" (or "Go to Chicago," or "Let's try Chicago," or "Destination Chicago," etc.), and the client device 300 can provide the utterance to the speech processing system 200 at [5].

The speech processing system 200 can again generate preliminary speech processing results for the current utterance. One of the top-scoring results may an interpretation that the utterance is an NSU providing a value for a "Destination-Location" slot. Because the context data store 212 includes a prior dialog act eliciting that particular slot value, the interpretation may be merged with the prior interpretation (also in the context data store 212) of "Search-Flights-Intent( . . . )" in order to provide the missing value for the "Destination-Location" slot. This time, the interpretation may be associated with a score indicating that the interpretation is likely the correct interpretation based on the lack of a higher scoring interpretation that is not merged (e.g., because the utterance was an NSU, there was no higher-scoring interpretation of a fully formed intent, as was the case when the user made the weather-related utterance at [3]). The dialog manager 208 can receive the merged interpretation with the fully formed "Search-Flights-Intent ( . . . )," and can initiate the requested action (e.g., by providing instructions to an application module configured to execute flight searches). The dialog manager 208 can produce a dialog act responsive to the intent, and the NLG module 210 can produce a response that is sent to the client device 300 at [6]. Illustratively, the response may be the results of the flight search, a confirmation of the intent (e.g., "Searching for flights to Chicago . . . "), elicitation of additional information (e.g., "When would you like to return?"), etc.

The interactions between the client device 300 and speech processing system 200 may continue after dialog act #4 at [6]. For example, the user may make a subsequent utterance that relates to the digression previously made by the user at [3]. The speech processing system 200 may use the context interpreter 206 as described above and in greater detail below to interpret the subsequent utterance in view of previous utterances and dialog acts, including the digression. In this case, the subsequent utterance can be merged with the digression and acted upon.

With reference to FIG. 3, an example of a potentially ambiguous intent that is interpreted using multi-turn interaction context will be described. Advantageously, interpreting current utterances within the context of prior turns in a multi-turn interaction can help solve ambiguities without requiring additional user input, and can help avoid initiating an incorrect action based on an interpretation of an utterance in isolation when the correct action is determinable in the context of the entire multi-turn interaction (or some portion thereof).

As shown in FIG. 3, a user may make a first utterance of a multi-turn interaction, which is transmitted by the client device 300 to the speech processing system 200 at [1]. Illustratively, the utterance may be "Play internet radio." The speech processing system 200 can process the utterance using the ASR module 202 and NLU module 204 as described above. The dialog manager 208 can store a semantic representation of the utterance (e.g., "Play-Internet-Radio-Station-Intent( . . . )") in the context data store 212, and generate a dialog act responsive to the utterance (e.g., "Elicit-Information(Radio-Station)"). The NLG module 210 may generate a user prompt based on the dialog act (e.g., "Which internet radio station?"), and the prompt may be provided to client device 300 at [2] for presentation to the user.

The user may respond to the elicitation with a potentially ambiguous utterance. For example, the user may say "Play Frank Sinatra." In isolation, that utterance may typically indicate that the user wishes to hear music by Frank Sinatra that the user owns (e.g., the utterance may be interpreted as "Play-Music-Intent(Artist='Frank Sinatra')"). However, in the present example, the user wishes to hear the "Frank Sinatra" internet radio station (e.g., properly interpreted as "Play-Internet-Radio-Intent(Station='Frank Sinatra')"), rather than music that the user owns. A system that interprets user utterances without access to the context of prior multi-turn interactions may determine that the utterance "Play Frank Sinatra" reflects a new user intent rather than a response to an elicitation of information regarding a prior user intent. Accordingly, such a system would begin playback of music that the user owns. In contrast, the context interpreter 206 of the speech processing system 200 can access prior interpretations of user utterances and prior dialog acts for this multi-turn interaction, and determine that the utterance "Play Frank Sinatra" was made in response to an elicitation for the name of an internet radio station. The context interpreter can therefore properly merge an interpretation of the user utterance (e.g., an NLU result indicating that the utterance is an NSU including a value for the "Station" slot) into the previously stored Play-Internet-Radio-Intent( . . . ). A response can then be generated and provided to the client device 300 at [4]. Illustratively, the response may be a stream of the requested internet radio station, a confirmation of the intent (e.g., "Playing the Frank Sinatra station"), elicitation of additional information, etc.

Process for Interpreting Utterances Using Multi-Turn Interaction Context

Figure 4:
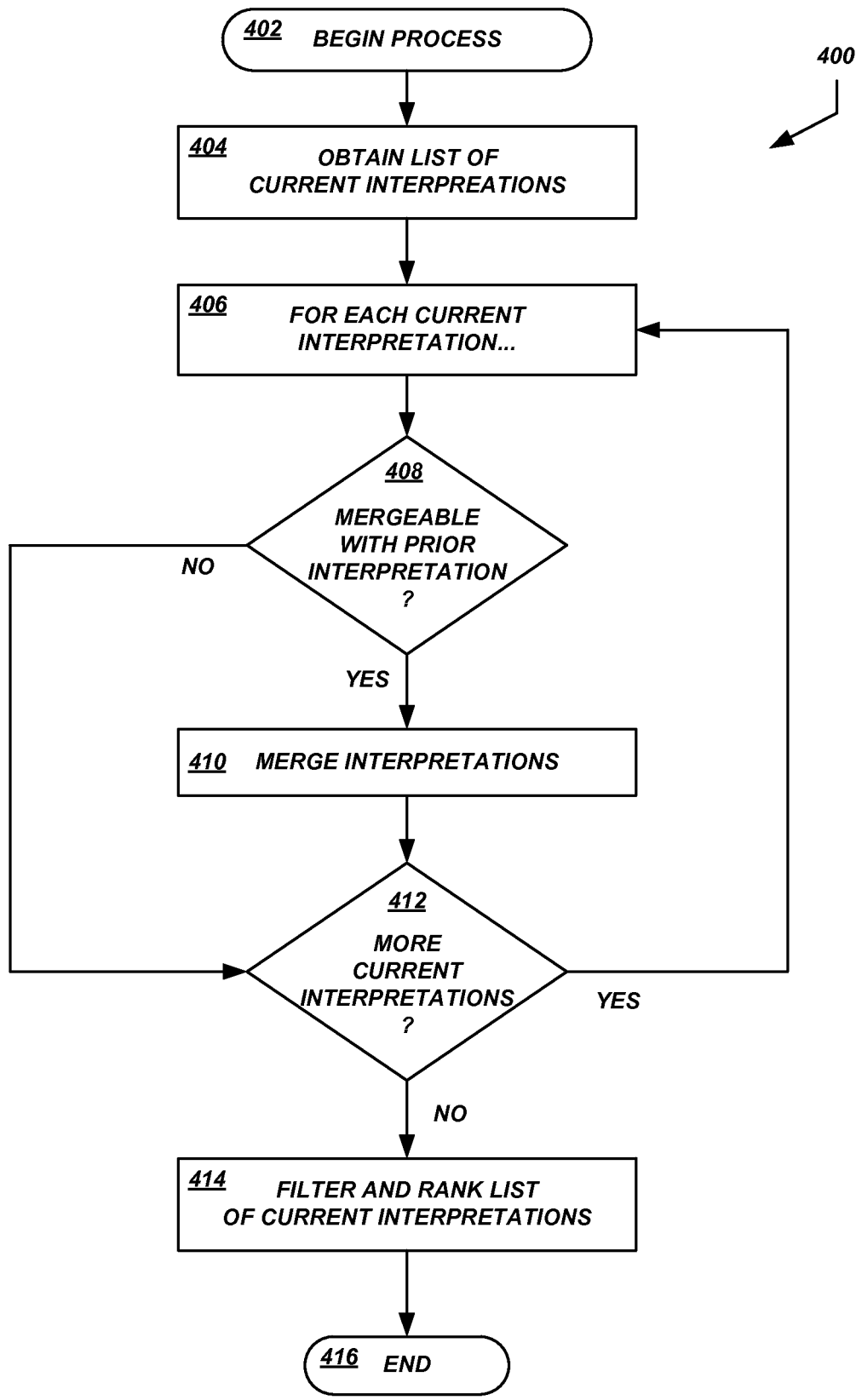
FIG. 4 is a flow diagram of an illustrative process for processing an utterance using a context interpreter.

With reference now to FIG. 4, a sample process 400 for processing a user utterance using multi-turn interaction context will be described. Advantageously, a context interpreter 206 or some other module or component of a speech processing system 200 performing the process 400 can modify individual speech processing results using a rule-based analysis of previous interpretations of user intent and previous dialog acts generated responsive to those intents. Such processing based on the context of the multi-turn interaction can allow more natural communication with a speech processing system and more robust dialog management without loss of context.

The process 400 begins at block 402. The process 400 may begin automatically upon receipt of input data (e.g., an n-best list of interpretations of a current user utterance) by a context interpreter 206 or some other module or component of a speech processing system 200. The process 400 may be embodied in a set of executable program instructions stored on a computer-readable medium, such as one or more disk drives, of a computing system of the speech processing system 200. When the process 400 is initiated, the executable program instructions can be loaded into memory, such as RAM, and executed by one or more processors of the computing system.

At block 404, the content interpreter 206 or some other module or component of the speech processing system 200 can obtain a list of interpretations of the current user utterance. Returning to the example illustrated in FIG. 3 and described above, the context interpreter 206 may receive an n-best list of interpretations for utterance #2, "Play Frank Sinatra." The n-best list may include a top-ranked interpretation of the user utterance as an intent to play Frank Sinatra music that the user owns (Play-Music-Intent(Artist='Frank Sinatra')"). The n-best list may include a lower-ranked interpretation of the user utterance as an NSU with a slot value of "Frank Sinatra" for a "Radio-Station" slot.

At block 406, the content interpreter 206 or some other module or component of the speech processing system 200 can iterate through each of the n-best results (or some subset thereof) to determine whether any particular result may be modified or merged with a previous intent. As described below, the determination can be a rule-based determination using contextual information regarding interpretations of previous user utterances and previously generated dialog acts in the present multi-turn interaction.

Figure 5:
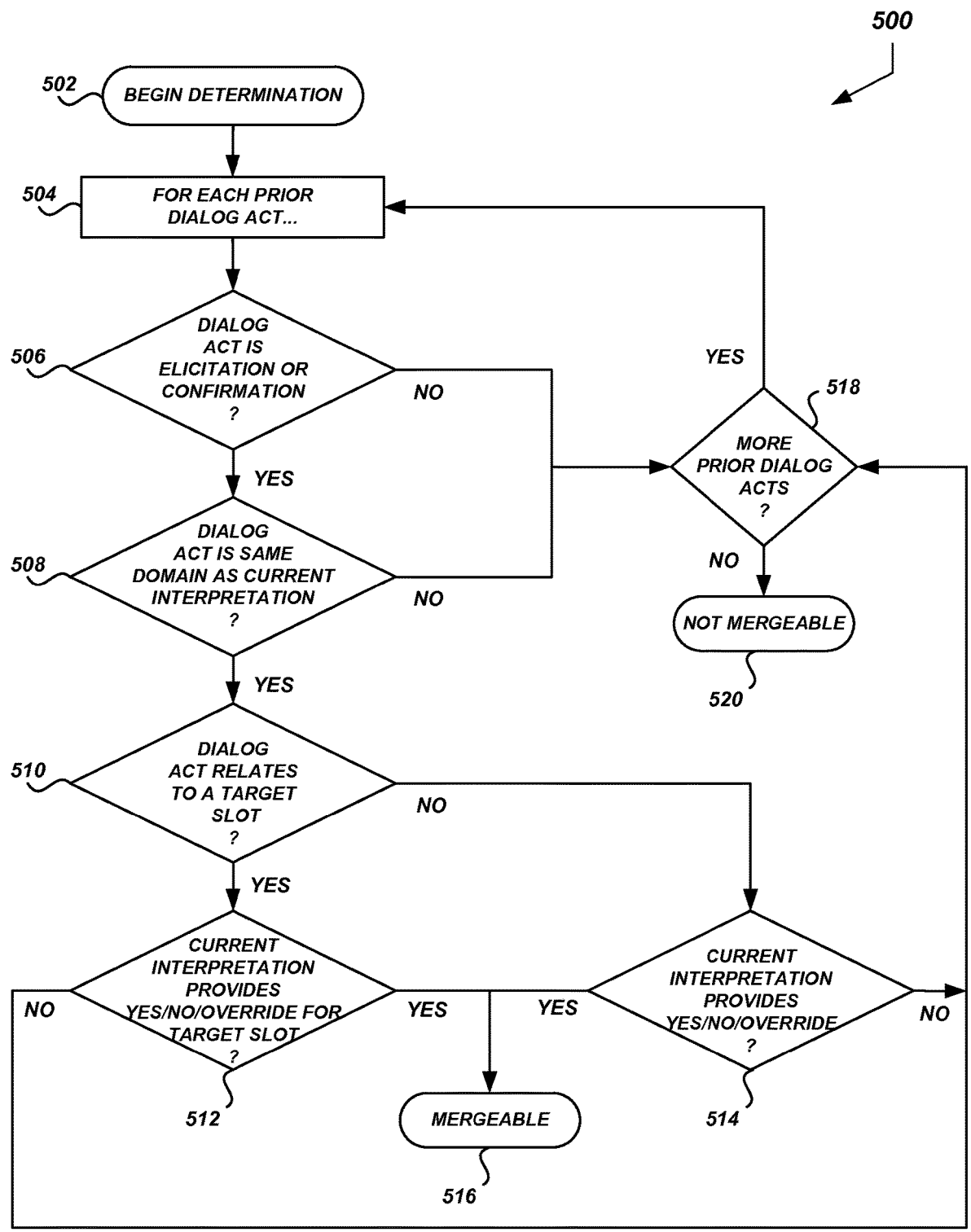
FIG. 5 is a flow diagram of an illustrative process for determining whether a current utterance interpretation can be merged with a prior utterance interpretation.

At decision block 408, the content interpreter 206 or some other module or component of the speech processing system 200 can determine whether a particular interpretation is able to be merged with a previously stored interpretation. One example rule-based process for determining whether an interpretation may be merged with a previously stored interpretation is illustrated in FIG. 5 and described in detail below. If the interpretation may be merged, the process 400 proceeds to block 410 where the interpretations can be merged. Otherwise, the process 400 proceeds to decision block 412, where it is determined whether there are additional interpretation results for the present utterance to analyze.

In some embodiments, a single interpretation of the current utterance can be merged with multiple (e.g., two or more) previously stored interpretations. For example, if an interpretation of the current utterance and each of multiple prior interpretations satisfy the rule-based framework shown in FIG. 5, then the interpretation may be merged with each of those prior interpretations and used as candidate results to be added to an n-best of interpretations.

Once the relevant interpretations have been processed using the context of the multi-turn interaction, the interpretations can be filtered, re-scored, or re-ranked at block 414 and provided to a downstream consumer of the interpretations, such as a dialog manager 208. For example, all un-merged NSUs may be filtered from the results. As another example, a merged interpretation may be given a score corresponding to the score of the previous interpretation with which a current interpretation was merged. In some embodiments, a context interpreter 206 may employ a machine learning model to re-score and/or re-rank the interpretations. For example, the features used by the machine learning model may include ASR results and/or scores for the current and any number of prior utterances; NLU results and/or scores for the current and any number of prior utterances; any number of previous dialog acts; etc. The model may then be used to provide a ranking or score for the results to be provided to downstream consumers of the interpretations. The process 400 can terminate at block 416.

FIG. 5 illustrates a sample process 500 for determining whether an interpretation may be merged with a previously stored interpretation. The process 500 begins at block 502. In some embodiments, the process 500 may begin automatically upon entry of decision block 408 in process 400 described above. The process 500 may be embodied in a set of executable program instructions stored on a computer-readable medium, such as one or more disk drives, of a computing system of the speech processing system 200. When the process 500 is initiated, the executable program instructions can be loaded into memory, such as RAM, and executed by one or more processors of the computing system. In some embodiments, the process 500 may be a subroutine of process 400, rather than a separate process embodied in a separate set of program instructions.

At block 504, the content interpreter 206 or some other module or component of the speech processing system 200 can iterate through each dialog act of the multi-turn interaction, or some subset thereof (e.g., only the previous 1 or 2 dialog acts) to determine whether the interpretation that is currently being considered may be modified or merged with a previous intent.

At decision block 506, the content interpreter 206 or some other module or component of the speech processing system 200 can determine whether the dialog act for the current iteration is an elicitation of information or a confirmation. If not, the process 500 can proceed to decision block 518, where it can be determined whether to iterate through any other prior dialog acts using the process 500. However, if the dialog act of the current iteration is indeed an elicitation or confirmation, the process 500 can proceed to decision block 508. Returning to the examples above, elicitation dialog acts where initiated at turn [2] of both FIGS. 2 and 3. In FIG. 2, the elicitation was for a destination name to fill a slot in a flight search intent. In FIG. 3, the elicitation was for a radio station name to fill a slot in an internet radio intent.

At decision block 508, the content interpreter 206 or some other module or component of the speech processing system 200 can determine whether the dialog act for the current iteration is in the same domain as the interpretation that is currently being considered. Generally described, a domain may correspond to a particular topic or subject, or to multiple (e.g., two or more) related topics and/or subjects. The meaning of a particular word or phrase may vary, depending upon the domain in which the word or phrase is used. If the dialog act of the current iteration is in the same domain as the interpretation that is currently being considered, the process 500 can proceed to decision block 510.

At decision block 510, the content interpreter 206 or some other module or component of the speech processing system 200 can determine whether the dialog act for the current iteration relates to a target slot. In the examples above, the elicitation dialog acts are related to target slots because they are eliciting values for those slots. The dialog acts at turn [6] in FIG. 2 and at turn [4] in FIG. 3 may relate to target slots if they are confirming values of particular slots. In these cases, the process may proceed to decision block 512. However, if those dialog acts are confirming intents or providing requested information (e.g., a listing of flights, playback of a radio station), then the dialog acts do not relate to target slots. In these cases, the process 500 may proceed to decision block 514.

At decision block 512, the content interpreter 206 or some other module or component of the speech processing system 200 can determine whether the interpretation currently being considered provides an acceptance, rejection, or replacement value for the target slot. If so, then the interpretation is able to be merged with a previous interpretation in the context of the multi-turn interaction—namely, the previous interpretation for which the dialog act of the current iteration of the process 500 was generated.

At decision block 514, the content interpreter 206 or some other module or component of the speech processing system 200 can determine whether the interpretation currently being considered provides an acceptance, rejection, or replacement value of a value in a previous interpretation in the context of the multi-turn interaction—namely, the previous interpretation for which the dialog act of the current iteration of the process 500 was generated. If so, then the interpretation is able to be merged with that previous interpretation.

Additional Embodiments

In some embodiments, statistical models may be used to determine whether interpretations can be merged with prior interpretations, rather than a set of rules as described above. For example, the probability that a particular interpretation within a multi-turn interaction context is correct can be determined using conditional random fields ("CRFs"), maximum entropy-based statistical classifiers, etc., or some combination thereof. One challenge when using such probabilistic methods is that a corpus of annotated training data is needed in order to train the models. Such data may be difficult to obtain or generate because it involves multi-turn interactions in which the sequence of the interactions is important, rather than simply a collection of discrete interactions. Therefore, a bootstrap approach may be used in order to obtain a sufficient amount of training data. For example, interaction data may be collected using the rule-based approach described above until a sufficient amount of training data is obtained, and then statistical models may be generated and used in place of (or in combination with) the rule framework.

Terminology

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware, or as software that runs on hardware, depends upon the particular application and design constraints imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a general purpose processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A computer-implemented method comprising:
   under control of a natural language processing system comprising one or more computing devices configured with specific computer-executable instructions,
   storing context information associated with a first natural language input and a first response to the first natural language input, wherein the context information comprises a semantic representation of the first natural language input and a semantic representation of the first response to the first natural language input, and wherein the first response to the first natural language input comprises a prompt, by the
natural language processing system, for information
from a user;

receiving (i) a second natural language input, and (ii) a
third natural language input, wherein the second
natural language input is received in response to the
first response and prior to receiving the third natural
language input, and wherein the third natural language input is received in response to a second
response, by the natural language processing system,
to the second natural language input;

determining that the second response does not comprise
a second prompt, by the natural language processing
system, for the information prompted by the first
response;

determining, subsequent to determining that the second
response does not comprise the second prompt, that
the first response comprises the prompt for information;

determining that the third natural language input is
associated with a same domain as the first natural
language input;

determining that a semantic representation of the third
natural language input comprises a slot value corresponding to the information prompted by the first
response;

determining, based at least partly on the third natural
language input relating to the information prompted
by the first response, to merge the semantic representation of the third natural language input with the
semantic representation of the first natural language
input;

generating natural language processing results for the
third natural language input by merging the semantic
representation of the third natural language input
with the semantic representation of the first natural
language input instead of a semantic representation
of the second natural language input; and generating a third response to the third natural language
input based at least partly on the natural language
processing results.

2. The computer-implemented method of claim 1,
wherein the first natural language input comprises text or
speech.

3. The computer-implemented method of claim 1,
wherein the semantic representation of the third natural
language input is merged with the semantic representation of
the first natural language input by replacing a slot value of
the semantic representation of the first natural language
input with a slot value of the semantic representation of the
third natural language input.

4. The computer-implemented method of claim 1,
wherein the semantic representation of the third natural
language input is merged with the semantic representation of
the first natural language input by replacing an intent of the
semantic representation of the first natural language input
with an intent of the semantic representation of the third
natural language input.

5. The computer-implemented method of claim 1,
wherein the natural language processing results are generated based at least partly on a context interpretation rule.

6. The computer-implemented method of claim 5,
wherein the context interpretation rule relates to determining
whether a domain associated with the first natural language
input is equivalent to a domain associated with the third
natural language input.

7. The computer-implemented method of claim 5,
wherein the context interpretation rule relates to determining
whether at least one of an intent or a slot associated with the
semantic representation of the first natural language input is
equivalent to at least one of an intent or a slot associated with
the semantic representation of the third natural language
input.

8. The computer-implemented method of claim 5,
wherein the context interpretation rule relates to the semantic representation of the first response to the first natural
language input.

9. The computer-implemented method of claim 8,
wherein the context interpretation rule further relates to
determining whether the semantic representation of the first
response to the first natural language input corresponds to an
elicitation of information associated with the semantic representation of the first natural language input.

10. The computer-implemented method of claim 8,
wherein the context interpretation rule further relates to
determining whether the semantic representation of the first
response to the first natural language input corresponds to a
confirmation of information associated with the semantic
representation of the first natural language input.

11. The computer-implemented method of claim 1, further
comprising re-ranking at least a portion of the natural
language processing results.

12. The computer-implemented method of claim 1, further comprising filtering at least a portion of the natural
language processing results.

13. The computer-implemented method of claim 1, further comprising determining that the semantic representation of the third natural language input is to be merged with
the semantic representation of the first natural language
input based at least partly on the semantic representation of
the third natural language input comprising a value for a
content slot, wherein the semantic representation of the first
natural language input comprises the content slot.

14. The computer-implemented method of claim 1, further comprising determining that the semantic representation of the third natural language input is to be merged with
the semantic representation of the first natural language
input based at least partly on the semantic representation of
the third natural language input comprising a value for an
intent, wherein the prompt for information comprises a
prompt for information regarding an intent of the first
natural language input.

15. A system comprising:
a computer-readable memory storing executable instructions; and
one or more processors in communication with the computer-readable memory, wherein the one or more processors are programmed by the executable instructions
to at least:
store context information associated with a first natural
language input and a first response by the system to
the first natural language input, wherein the context
information comprises a semantic representation of
the first natural language input and a semantic representation of the first response, and wherein the first
response comprises a prompt for information;
receive (i) a second natural language input and (ii) a
third natural language input, wherein the second
natural language input is received in response to the
first response and prior to receiving the third natural
language input, and wherein the third natural language input is received in response to a second response by the system to the second natural language input;

determine that the second response does not comprise a second prompt by the system for the information prompted by the first response;

determine, subsequent to determining that the second response does not comprise the second prompt, that the first response comprises the prompt for information;

determine that the third natural language input is associated with a same domain as the first natural language input;

determine that a semantic representation of the third natural language input comprises a slot value corresponding to the information prompted by the first response;

determine, based at least partly on the third natural language input relating to the information prompted by the first response, to merge the semantic representation of the third natural language input with the semantic representation of the first natural language input;

generate natural language processing results for the third natural language input by merging the semantic representation of the third natural language input with the semantic representation of the first natural language input instead of a semantic representation of the second natural language input; and generate a third response to the third natural language input based at least partly on the natural language processing results.

16. The system of claim 15, wherein the semantic representation of the first natural language input comprises a data structure comprising:

a first data element representing a domain of the first natural language input;

a second data element representing an intent of the first natural language input; and one or more additional data elements representing one or more slots associated with the intent.

17. The system of claim 15, wherein the one or more processors are further programmed by the executable instructions to add, to a ranked set of natural language processing results, a merged semantic representation comprising the semantic representation of the third natural language input merged with the semantic representation of the first natural language input, wherein the ranked set of natural language processing results comprises a semantic representation of the third natural language input, and wherein the merged semantic representation is associated with ranking data used to add the merged semantic representation at a particular position in the ranked set of natural language processing results.

18. The system of claim 15, wherein the one or more processors are further programmed by the executable instructions to determine that a semantic representation of the third natural language input comprises a value associated with a slot of an intent of the semantic representation of the first natural language input, and wherein the information prompted by the first response is associated with the slot.

19. The system of claim 15, wherein the first natural language input, the second natural language input, and the third natural langue input are each individual dialog turns of a multi-turn dialog, and wherein the one or more processors are further programmed to:

determine to iterate through a first subset of dialog turns of the multi-turn dialog; and iterate through the first subset of dialog turns to determine whether to merge the semantic representation of the third natural language input with individual semantic representations of a plurality of semantic representations associated with the first subset of dialog turns, wherein the one or more processors do not iterate through a second subset of dialog turns of the multi-turn dialog.

* * * * *